C. VESTERGAARD.
HORSESHOE SPREADER.
APPLICATION FILED MAR. 28, 1910.
975,810.
Patented Nov. 15, 1910.
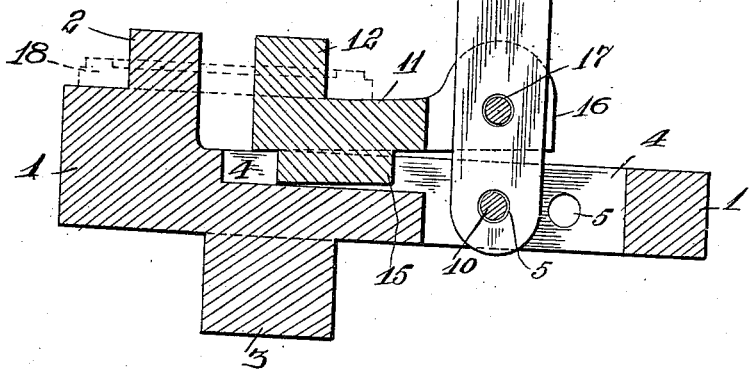
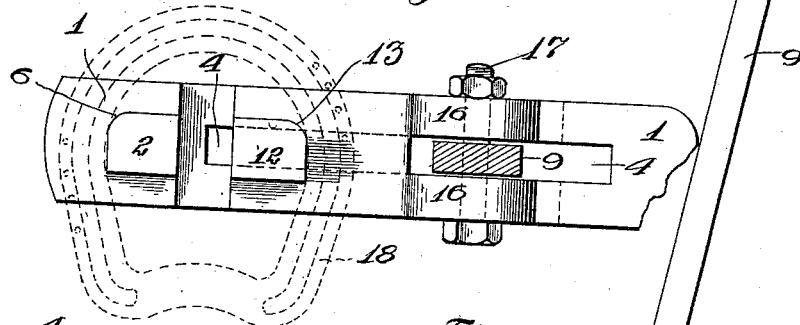
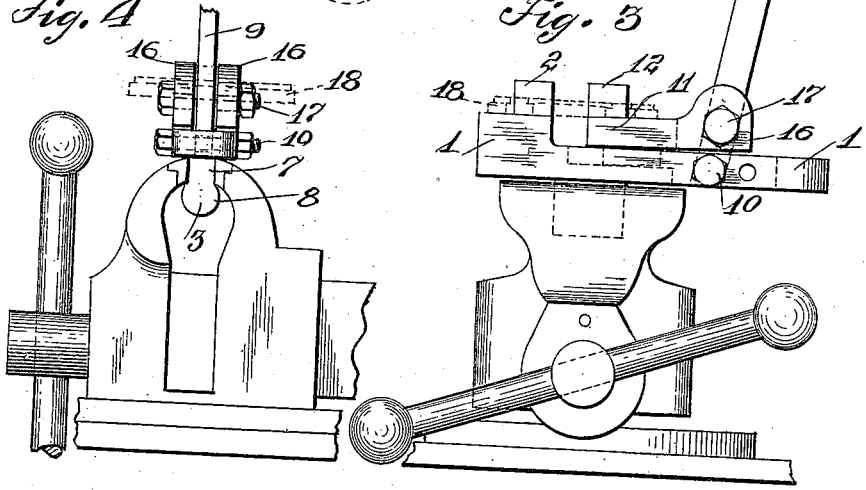
WITNESSES
INVENTOR
Christian Vestergaard
By
His Attorney

UNITED STATES PATENT OFFICE.

CHRISTIAN VESTERGAARD, OF CHICAGO, ILLINOIS.

HORSESHOE-SPREADER.

975,810.  Specification of Letters Patent.  Patented Nov. 15, 1910.

Application filed March 28, 1910. Serial No. 552,091.

*To all whom it may concern:*

Be it known that I, CHRISTIAN VESTERGAARD, a citizen of the United States, residing at Chicago, county of Cook, and State of Illinois, have invented a certain new and useful Horseshoe-Spreader, of which the following is a specification.

My invention relates to a certain new and useful device for spreading horseshoes and has for its object the production of a device adapted for such use which shall be of simple construction and efficient in its operation.

The invention consists in the combination and arrangement of parts hereinafter described and claimed.

The invention will be more readily understood by reference to the accompanying drawings forming a part of this specification, and in which, Figure 1 is a vertical longitudinal section through the body of a device embodying my invention, Fig. 2, a top plan view of the device shown in Fig. 1, Fig. 3, an elevation illustrating the device secured in a vise ready for use, and Fig. 4, a partial elevation at right angles to Fig. 3.

The preferred form of construction as illustrated in the drawings comprises a body member 1 provided with an upwardly extending horn 2, a downwardly extending securing lug 3 and a central longitudinal slot 4, there being bolt holes 5 traversing said body member and said slot at different longitudinal distances from horn 2. The body member 1 is formed of a single casting, the edge 6 of horn 2 being rounded to adapt it to better contact with a horseshoe and the lug 3 being formed with an upper portion 7 having parallel sides adapted to be engaged by the jaws of a vise and an enlarged bottom portion 8 adapted to constitute a stop to prevent removal from the vise. An operating lever 9 is provided at its lower end with a bolt hole adapted to register with either of the bolt holes 5 when said lever is inserted in slot 4. A bolt 10 adapted to pass through either arrangement of bolt holes serves as a fulcrum for lever 9 in body member 1. A draft link 11 is pivoted to operating lever 9 and provided with a horn 12 adapted to coöperate with horn 2 to spread a horseshoe, the corner 13 thereof being rounded as is the corner 6 of horn 2 and for the same reason. The link 11 is also provided with a downwardly projecting guide lug 15 engaging within the inner portion of slot 4 and serving to maintain horn 12 in proper relation with horn 2 during the spreading operation. Draft link 11 is formed of a single casting and is provided with a bifurcated end 16 adapted to embrace lever 9 and provided with a bolt hole adapted to register with a corresponding bolt hole in said lever and receive a pivotal bolt 17.

In use the body member 1 is secured in a vise by means of the lug 3 and a horseshoe 18 which it is desired to spread is placed over the horns 2 and 12, lever 9 being positioned so as to cause horn 12 to approach horn 2 closely enough to permit of this. Then a powerful spreading force is exerted upon said horseshoe by means of lever 9 and the horseshoe spread as desired. For different sizes of horseshoes lever 9 may be adjusted to the different bolt holes 5. This device is especially adapted for use in spreading horseshoes provided with rubber treads which cannot be heated, but also may be used to advantage for spreading the usual wire shoes.

While I have illustrated and described the preferred construction for carrying my invention into effect this is capable of variation and modification without departing from the spirit of the invention. I therefore do not wish to be limited to the exact details of construction set forth but desire to avail myself of such variations and modifications as come within the scope of the appended claims.

Having described my invention what I claim as new and desire to secure by Letters Patent is:

1. In a device of the class described, the combination with a body member of a horn projecting therefrom; a lever pivoted in said body member; and a draft member connected with said lever and provided with a horn adapted to coöperate with said first mentioned horn to spread a horseshoe, substantially as described.

2. In a device of the class described, the combination with a body member of a horn projecting from the top thereof; a securing lug on the bottom of said body member adapted to be engaged by the jaws of a vise; a lever pivoted in a central slot in said body member; a draft link slidable in said slot and pivoted to said lever; and a horn on said link adapted to coöperate with said first mentioned horn to spread a horseshoe, substantially as described.

3. In a device of the class described, the combination with a body member of a horn projecting from the top thereof; a securing lug on the bottom of said body member adapted to be engaged by the jaws of a vise, the upper portion of said lug having flat parallel sides adapted to be engaged by the vise jaws and the lower portion thereof being enlarged to constitute a stop; a lever pivoted in a central slot in said body member; a draft link slidable in said slot and pivoted to said lever; and a horn on said link adapted to coöperate with said first mentioned horn to spread a horseshoe, substantially as described.

4. In a device of the class described, the combination with a body member comprising a single casting having an upwardly projecting horn, a downwardly projecting securing lug and a central longitudinal slot, there being two bolt holes traversing said body member at said slot and at different distances from said horn; a lever adapted to enter said slot and provided with a bolt hole adapted to register with either of said first mentioned bolt holes and a second bolt hole above said body member; a link comprising a single casting having an upwardly projecting horn adapted to coöperate with said first mentioned horn, a downwardly projecting guide lug slidable in said slot and a bifurcated end, there being a bolt hole traversing said bifurcated end; and bolts adapted to pass through said bolt holes, substantially as described.

In testimony whereof I have signed my name to this specification in the presence of two subscribing witnesses.

CHRISTIAN VESTERGAARD.

Witnesses:
HELEN F. LILLIS,
JOSHUA R. H. POTTS.